United States Patent
Goel (10) Patent No.: US 11,743,363 B1
(45) Date of Patent: Aug. 29, 2023

(54) METHODS, SYSTEMS, AND COMPUTER READABLE MEDIA FOR UTILIZING NETWORK FUNCTION (NF) SERVICE ATTRIBUTES ASSOCIATED WITH REGISTERED NF SERVICE PRODUCERS IN A HIERARCHICAL NETWORK

(71) Applicant: Oracle International Corporation, Redwood Shores, CA (US)

(72) Inventor: Yesh Goel, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/751,584

(22) Filed: May 23, 2022

(51) Int. Cl.
    *H04L 67/63* (2022.01)
    *H04L 67/51* (2022.01)

(52) U.S. Cl.
    CPC .............. *H04L 67/63* (2022.05); *H04L 67/51* (2022.05)

(58) Field of Classification Search
    CPC ..... H04L 67/51; H04L 41/12; H04L 41/0895; H04L 41/122; H04L 41/40; H04L 41/5058; H04L 45/02
    See application file for complete search history.

(56) References Cited

U.S. PATENT DOCUMENTS

| | | | | |
|---|---|---|---|---|
| 10,833,938 | B1* | 11/2020 | Rajput | H04L 67/1095 |
| 10,856,158 | B2* | 12/2020 | Mendoza | H04L 67/1095 |
| 11,477,670 | B2* | 10/2022 | Mendoza | H04L 67/1095 |
| 11,558,732 | B1* | 1/2023 | Malhotra | H04W 24/02 |
| 2020/0127916 | A1* | 4/2020 | Krishan | H04L 47/125 |
| 2020/0296606 | A1* | 9/2020 | Mendoza | H04L 41/12 |
| 2021/0084508 | A1* | 3/2021 | Mendoza | H04L 67/1095 |
| 2021/0258861 | A1* | 8/2021 | Wang | H04L 67/51 |
| 2021/0367854 | A1* | 11/2021 | Lee | H04L 41/0806 |

(Continued)

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

(Continued)

*Primary Examiner* — David R Lazaro
(74) *Attorney, Agent, or Firm* — Jenkins, Taylor & Hunt, P.A.

(57) ABSTRACT

Methods, systems, and computer readable media for utilizing network function (NF) service attributes associated with registered network function service producers in a hierarchical network are disclosed. One method comprises receiving, by a root network function repository function (NRF) operating in a hierarchical network and from a regional NRF operating in a first region of the hierarchical network, a NF registration message or a NF update message, wherein the NF registration message or NF update message includes an NrfInfo structure that contains one or more NF service attributes specifying one or more NF services provided by at least one NF service producer registered with the regional NRF. The method further includes extracting, by the root NRF, the one or more NF service attributes from the NrfInfo structure, and creating, by the root NRF, one or more indexed entries containing the one or more NF service attributes in a local state information database.

20 Claims, 6 Drawing Sheets

(56) References Cited

U.S. PATENT DOCUMENTS

| | | | |
|---|---|---|---|
| 2021/0385732 A1* | 12/2021 | Reyes | G06F 16/90335 |
| 2022/0070648 A1* | 3/2022 | Krishan | H04L 67/101 |
| 2022/0191294 A1* | 6/2022 | Yang | H04L 41/5058 |
| 2022/0272510 A1* | 8/2022 | Samdanis | H04W 24/10 |
| 2022/0330085 A1* | 10/2022 | Li | H04L 67/565 |
| 2022/0346188 A1* | 10/2022 | Malhotra | H04L 67/1008 |
| 2022/0393971 A1* | 12/2022 | Bartolome Rodrigo | H04L 45/02 |
| 2022/0394453 A1* | 12/2022 | Goel | H04W 12/086 |
| 2022/0394597 A1* | 12/2022 | Goel | H04W 48/14 |
| 2023/0006888 A1* | 1/2023 | Turina | H04L 41/122 |
| 2023/0007536 A1* | 1/2023 | Sharma | H04W 28/0842 |
| 2023/0019209 A1* | 1/2023 | Rajput | H04L 41/12 |
| 2023/0110286 A1* | 4/2023 | Jayaramachar | H04W 8/20 370/329 |
| 2023/0188972 A1* | 6/2023 | Goel | H04W 8/20 370/328 |

OTHER PUBLICATIONS

"3rd Generation Partnership Project; Technical Specification Group Core Network and Terminals; 5G System; Technical Realization of Service Based Architecture; Stage 3 (Reiease 17)," 3GPP TS 29.500, V17.6.0, pp. 1-126 (Mar. 2022).

\* cited by examiner

```
"nrfInfo": {
  "servedPcfInfo": {
    "5e23ebb0-c493-48ee-8df9-2c24579caaa2": {
      "supiRangeList": [
        {
          "start": "262720000000000",
          "end": "262729999999999"
        }
      ]
    }
  },
  "nfServices": [
    {
      "serviceInstanceId": "0306f893-cf9e-4f1a-9827-06716fa91d01",
      "serviceName": "npcf-am-policy-control",
      "versions": [
        {
          "apiVersionInUri": "v1",
          "apiFullVersion": "1.0.0"
        }
      ],
      "scheme": "http",
      "nfServiceStatus": "REGISTERED",
      "fqdn": "ocpcfvcp1-pcf-ingress-gateway.ocpcfvcp1.svc",
      "allowedNfTypes": [
        "AMF",
        "NEF"
      ],
      "priority": 10,
      "capacity": 100,
      "load": 0
    }
  ]
}
```

METHODS, SYSTEMS, AND COMPUTER READABLE MEDIA FOR UTILIZING NETWORK FUNCTION (NF) SERVICE ATTRIBUTES ASSOCIATED WITH REGISTERED NF SERVICE PRODUCERS IN A HIERARCHICAL NETWORK

TECHNICAL FIELD

The subject matter described herein relates to the registration and management of network function (NF) servicer producers in fifth generation (5G) communications networks. More particularly, the subject matter described herein relates to methods, systems, and computer readable media for utilizing NF service attributes associated with registered NF service producers in a hierarchical network.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a network function (NF) service producer. A network node that consumes services is referred to as a NF service consumer. A network function can be both a NF service producer and a NF service consumer depending on whether it is consuming or providing service.

A given NF service producer may have many service endpoints. NF service producers register with a network function repository function (NRF). The NRF maintains a NF profile of available NF instances and their supported services. Consumer NFs can subscribe to receive information about NF service producer instances that have registered with the NRF. Once registered, NF instances in the 5G network may establish sessions with one or more network exposure functions (NEFs). Notably, the NEF is a Third Generation Partnership Project (3GPP) network function that provides a means to securely expose the services and capabilities provided by producer network functions servicing the network.

In many instances, a 5G network may be segmented into multiple regions in accordance to a hierarchical deployment. In such a configuration, a root NRF must be designated and configured to communicate with a plurality of regional NRFs positioned in the various regions of the network (e.g., a public land mobile network (PLMN)). More specifically, each regional NRF is configured to register itself with the root NRF using the 'NrfInfo' attribute. As per 3GPP 29.510, if a NRF receives a Nnrf service request (e.g., such as subscription request, discovery request, or access-token service request) and that NRF does not have the information needed to fulfil the request, then that NRF forwards the service request to a pre-configured NRF. In the hierarchical deployment, the root NRF is assigned as the pre-configured NRF.

In some implementations, the root NRF prepares state data from the NF updates that are received from the regional NRFs. Moreover, for each Nnrf service or discovery request forwarded to the root NRF from a regional NRF, the root NRF uses its state data to determine and designate a target regional NRF that may service the request. In particular, the root NRF is configured to process the forwarded Nnrf service request and attempts to identify a regional NRF with registered NF service producers capable of servicing the request (e.g., the root NRF references stored <NF-Type>Info and <NF-Type>InfoList attribute data and mapped nfinstance identifiers associated with NF service producers). As used herein, <NF-Type>Info and <NF-Type>InfoList can also be respectively represented as xxxinfo and xxxinfolist, where <NF-Type>Info or 'xxx' represents a specific NF-type per 3GPP 29.510 section 6.1.6.3.3.

However, because a root NRF is not typically provisioned with information detailing the specific services supported/provided by NF service producers, the root NRF may unnecessarily forward the Nnrf service request to multiple regional NRFs in an attempt to locate the appropriate regional NRF (and NF service producer) that can adequately handle the service request. More specifically, the root NRF's capability to determine a target regional NRF that can service the request is limited to the content of the attribute data in the <NF-Type>Info and <NF-Type>InfoList structures that are previously provided by the regional NRFs. However, the <NF-Type>Info and <NF-Type>InfoList structures notably do not contain any information of the NF services that are registered by the NFs (whose information has been synched to the root NRF by the regional NRF). Without the knowledge of which NF services are supported by a given NF (and regional NRF), a root NRF would need to ignore any NF service parameter in the request and determine the target regional NRF based only on the NF-Type information. As indicated above, such a deficiency can compel the root NRF to repeatedly re-route the request to another regional NRF. As such, this behavior of the root NRF is considered inefficient and generates considerable transaction latencies in the network.

Accordingly, there exists a need for improved methods and systems for utilizing network function service attributes associated with registered network function service producers in a hierarchical network.

SUMMARY

Methods, systems, and computer readable media for utilizing network function (NF) service attributes associated with registered network function service producers in a hierarchical network are disclosed. One method comprises receiving, by a root network function repository function (NRF) operating in a hierarchical network and from a regional NRF operating in a first region of the hierarchical network, a NF registration message or a NF update message, wherein the NF registration message or NF update message includes an NrfInfo structure that contains one or more NF service attributes specifying one or more NF services provided by at least one NF service producer registered with the regional NRF. The method further includes extracting, by the root NRF, the one or more NF service attributes from the NrfInfo structure, and creating, by the root NRF, one or more indexed entries containing the one or more NF service attributes in a local state information database.

According to another aspect of the method described herein, the root NRF is configured to direct a service request message received from a second regional NRF to the regional NRF using the one or more NF service attributes stored in the local state information database.

According to another aspect of the method described herein, the service request message includes at least one of: a Nnrf subscription request message, a Nnrf discovery request message, or a Nnrf access token request message.

According to another aspect of the method described herein, the regional NRF is configured to insert the one or more NF service attributes as a customized attribute in the NrfInfo structure.

According to another aspect of the method described herein, the customized attribute includes a customized NF service structure that specifies the one or more NF services.

According to another aspect of the method described herein, the NrfInfo structure is provided to the root NRF via an NF profile update message sent by the regional NRF.

According to another aspect of the method described herein, the NrfInfo structure is a JavaScript Object Notation (JSON) data structure.

According to another aspect of the disclosed subject matter described herein, one system for utilizing one or more NF service attributes associated with registered network function service producers in a hierarchical network comprises a regional NRF operating in a first region of the hierarchical network and configured to generate a NF registration message or a NF update message. The system also includes a root NRF that operates in a hierarchical network and includes a local state information database configured to receive, from the regional NRF, the NF registration message or the NF update message, wherein the NF registration message or NF update message includes an NrfInfo structure that contains the one or more NF service attributes specifying one or more NF services provided by at least one NF service producer registered with the regional NRF, extract the one or more NF service attributes from the NrfInfo structure, and create one or more indexed entries containing the one or more NF service attributes in a local state information database.

According to another aspect of the system described herein, the root NRF is configured to direct a service request message received from a second regional NRF to the regional NRF using the one or more NF service attributes stored in the local state information database.

According to another aspect of the system described herein, the service request message includes at least one of: a Nnrf subscription request message, a Nnrf discovery request message, or a Nnrf access token request message.

According to another aspect of the system described herein, the regional NRF is configured to insert the one or more NF service attributes as a customized attribute in the NrfInfo structure.

According to another aspect of the system described herein, the customized attribute includes a customized NF service structure that specifies the one or more NF services.

According to another aspect of the system described herein, the NrfInfo structure is provided to the root NRF via an NF profile update message sent by the regional NRF.

According to another aspect of the system described herein, the NrfInfo structure is a JSON data structure.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using one or more computer readable media having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for utilizing network function service attributes associated with registered network function service producers in a hierarchical network. In particular, the disclosed subject matter includes methods and systems that enable regional NRFs in a hierarchical network to share the NF service information for each registered NF with the root NRF via NF profile updates. In some embodiments, the root NRF is configured to store the supported NF service information for each NF (as shared by the regional NRFs) in its local state information database. After subsequently receiving NF Discovery, Subscription, and Access-Token requests that indicate a requested service, the root NRF accesses its local state information database to identify the matching NFs as well as the corresponding regional NRFs to which these NFs are registered and send heartbeat messages. Notably, the root NRF routes and/or re-routes to only the identified regional NRFs to avoid unnecessary and/or wasted communication attempts.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
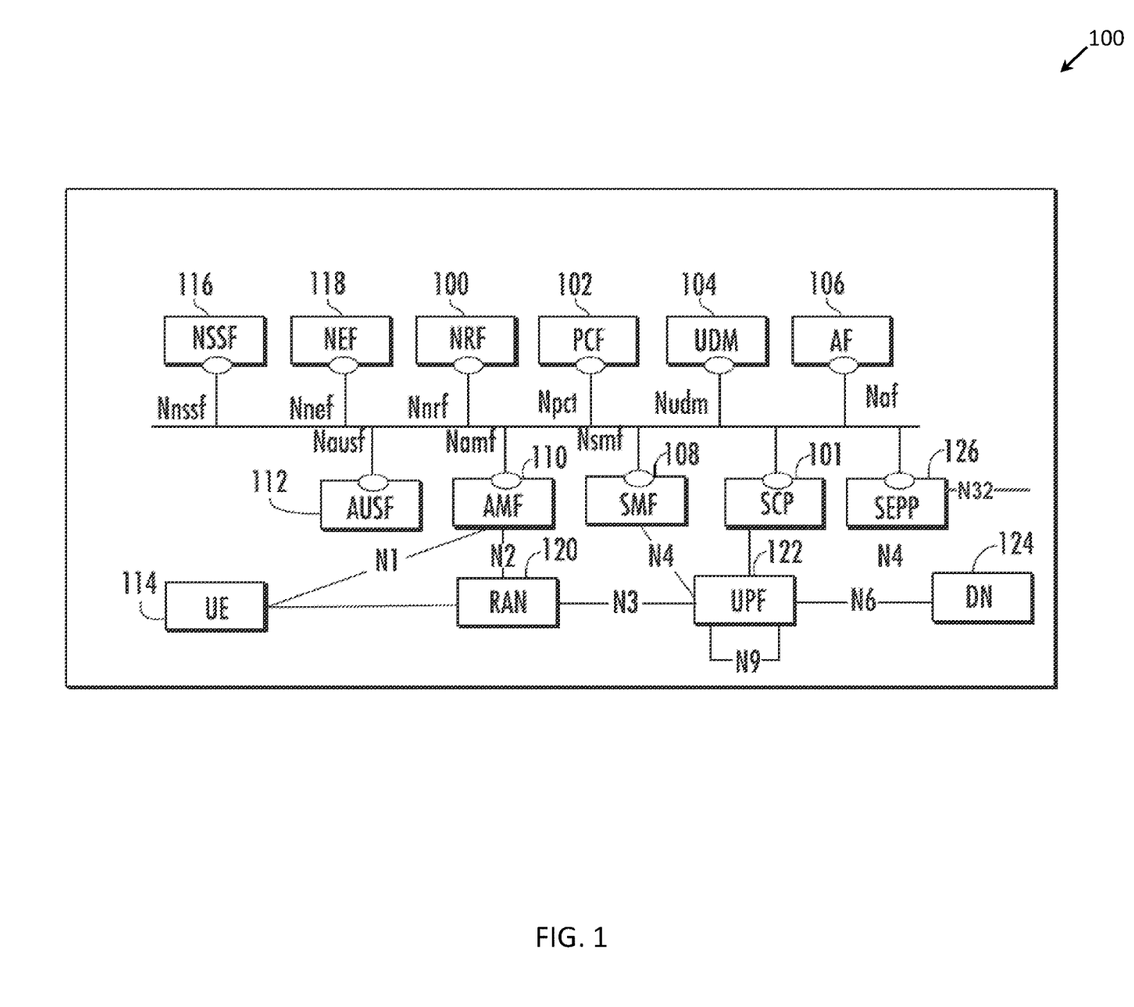
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available NF service producer service instances and their supported services and allow consumer NFs or SCPs to subscribe to and be notified of the registration of new/updated NF service instances. SCP 101 may also support service discovery and selection of NF instances. SCP 101 may perform load balancing of connections between consumer and NF service producers. In addition, using the methodologies described herein, SCP 101 may perform preferred NF location based selection and routing.

NRF 100 is a repository for NF or service profiles of NF instances. In order to communicate with a NF instance, a consumer NF or an SCP must obtain the NF service profile or the NF instance from NRF 100. The NF or service profile is a JavaScript object notation (JSON) data structure defined in 3GPP Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or NF service producers, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. In some embodiments, the SEPP is an gateway device positioned on the edge of a network.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a NF service producer after applying application level security protection.

Figure 2:
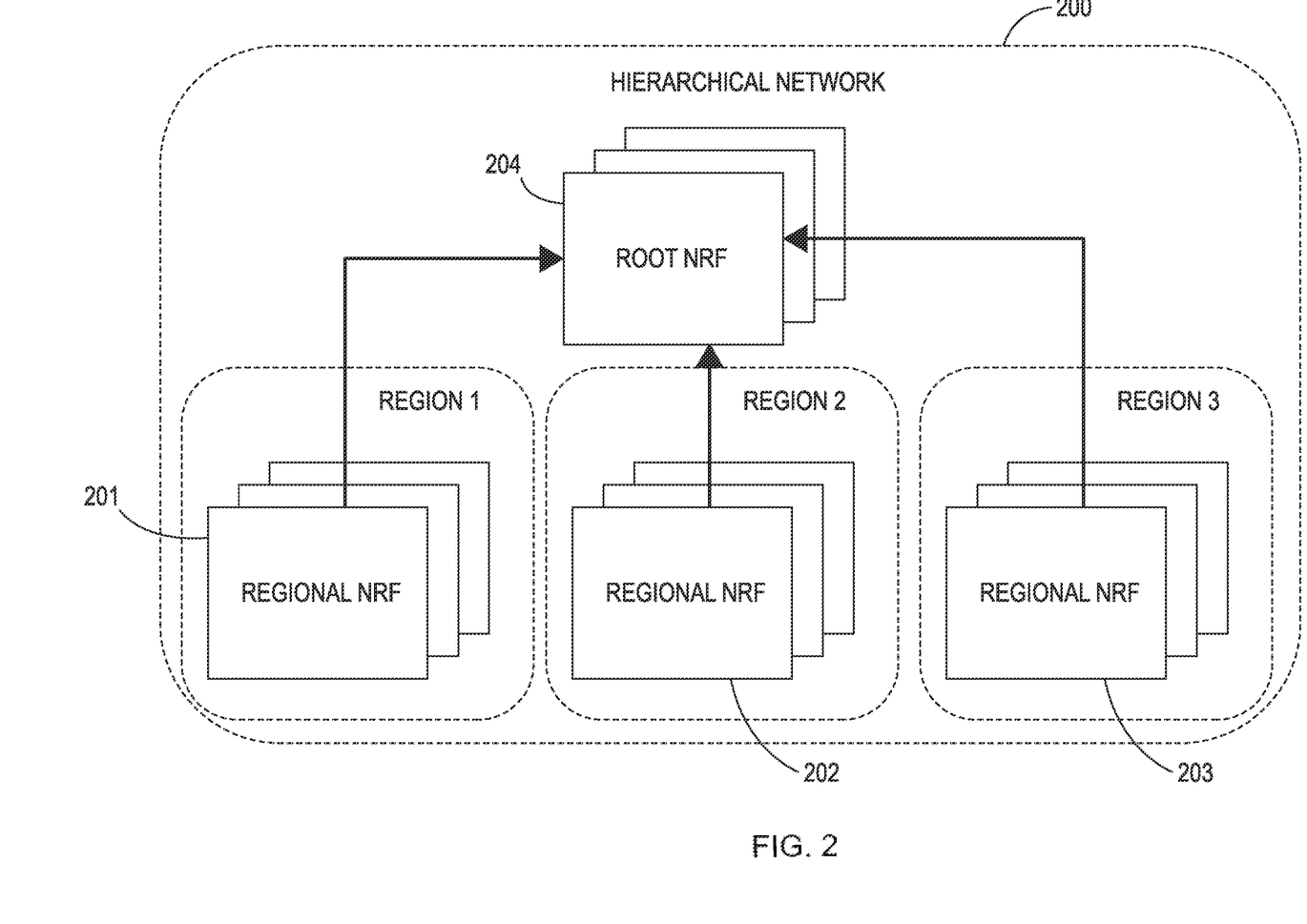
FIG. 2 is a block diagram illustrating a network including a plurality of network function repository functions (NRFs) operating in a hierarchical deployment.

As indicated above, the deployment of an NRF hierarchical system is typically needed when two or more NRF segments are supported in a given network, such as a public land mobile network (PLMN). To illustrate, FIG. 2 depicts a hierarchical network 200 that includes a plurality of regional NRFs 201-203 and a root NRF 204. Notably, each of regional NRFs 201-203 is located in a separate network segments, or regions. Each regional NRF is configured to provide management, discovery, and access-token services to registered regional NFs (e.g., NF profile updates for both NF service consumers and NF service producers). Regional NRFs 201-203 may also be configured to forward Nnrf Discovery, Subscription and Access-token service requests to root NRF 204 if a specific service request from an NF service consumer cannot be serviced by the regional NRF (and/or its registered NF service producers in the region) that originally receives the service request from the NF service consumer.

In some embodiments, root NRF 204 may be a part of and/or reside in any of network segment of hierarchical network 200. Root NRF 204 can also be deployed as a geo-redundant element for purposes of high-availability. Moreover, each of regional NRFs 201-203 and root NRF 204 is depicted in FIG. 2 as including redundant failover backups (e.g., three instances of each regional NRF in each region). Namely, the failover backups illustrated in FIG. 2 represent triple side redundancy measures employed by the operator(s) of hierarchical network 200.

In some embodiments, root NRF 204 is designated and configured to communicate with each the plurality of regional NRFs 201-203 positioned and/or operating in the various regions of a PLMN. More specifically, each of regional NRF 201-203 is configured to register itself with root NRF 204. Notably, the registration message and/or NF update message sent by a regional NRF to root NRF 204 contains an NF profile that includes 'NrfInfo attribute' information. As used herein, NrfInfo attribute information refers to a minimal amount of data that describes a regional NRF, its registered NF service producers, and the services provided by the registered NF service producers. In some embodiments, the NrfInfo attribute information is an array that contains a listing of nfinstance identifiers (i.e., nfinstanceIDs) corresponding to various NF service producers registered with the regional NRF.

As per the 3GPP 29.510 standard, if a regional NRF receives a Nnrf service request (e.g., such as a Nnrf subscription request, Nnrf discovery request, or Nnrf access-token request) and does not have the information (e.g., NF service producer identifier) needed to fulfil the request, then that regional NRF is configured to forward the service request to another pre-configured NRF. In a hierarchical deployment, the pre-configured NRF is designated as the 'root NRF' (e.g., root NRF 204) for the network. Specifically, the root NRF is configured to process the received service request from the regional NRF in a first region and attempts to identify another regional NRF in a different region that includes registered NF service producers that can provide the requested service. More specifically, root NRF 204 may then attempt to forward the service request to the target regional NRF which can further process the service request. While the root NRF may store includes NF type information (e.g., <NF-Type>Info and/or <NF-Type>InfoList structures), the root NRF is typically not provided with NF service attributes and/or does not typically store NF service attributes that are mapped to NF service producer instance identifiers.

Figure 3:
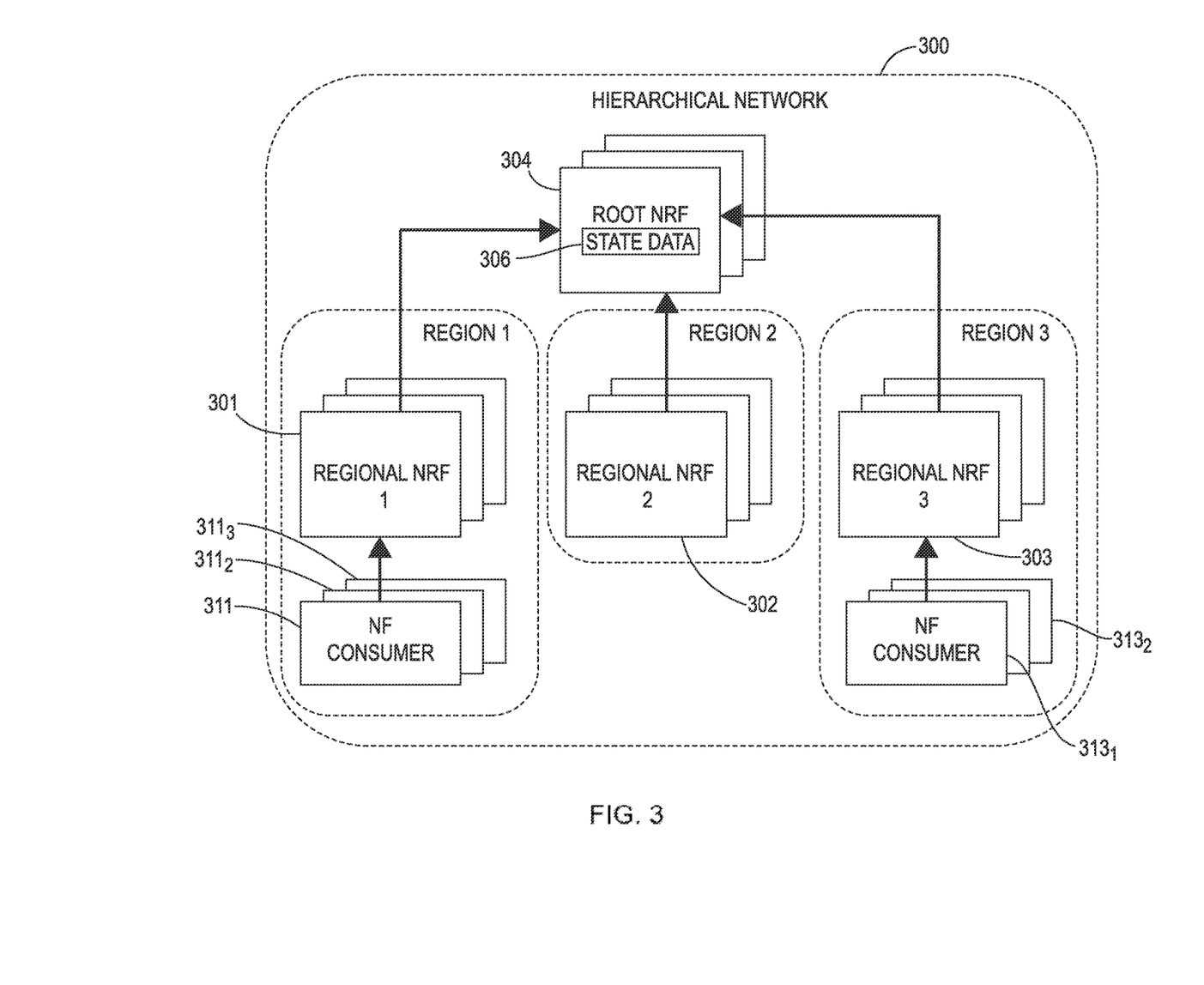
FIG. 3 is a block diagram illustrating a network including a plurality of NRFs utilizing NF service attributes while operating in a hierarchical deployment.

FIG. 3 depicts a block diagram of a hierarchical network 300 that includes regional NRFs 301-303 that provide NF service attributes (e.g., NF service name information or NF service attribute data) in customized attributes included in NrfInfo structures sent to a root NRF. As indicated above, a registered NF service producer's service information (i.e., NF service attribute(s)) is typically not propagated or provided by a regional NRF to the root NRF. Consequently, the NF services (e.g., Nnrf service operations) provided by NF service producers cannot be promptly discovered by a root NRF for NF service consumers operating in other regions supported by other regional NRFs (since the NF service attribute is not forwarded to the root NRF) in a hierarchical deployment. To illustrate an example scenario, consider NF service producer $313_1$ registering with regional NRF 303 in region 3. Notably, NF service producer $313_1$ registers with regional NRF 303. In some embodiments, NF service producer $313_1$ registers by sending a registration message (to regional NRF 303) containing an NF profile that includes an NF instance identifier (i.e., instance ID), other NF Profile attributes (as defined in 3GPP TS 29.510 section 6.1.6.2.2 Type: NF Profile), info attributes (e.g., <NF-Type>Info and/or <NF-Type>InfoList structures), and a list of one or more NF service structure(s) (as defined in 3GPP TS 29.510 section 6.1.6.2.3 Type: NF Service) including service names and other NF Service attributes that the NF service producer provides. After receiving the NF profile from the registering NF service producer, regional NRF 303 may be configured to send a NRF's NF registration request (or NRF's NF update registration request) to root NRF 304. Notably, the NRF's NF registration request or NRFs NF update registration request (i.e., an NRF's NF profile update) as sent by the regional NRF to the root NRF contains the instance ID of the regional NRF itself, other Regional NRFs NF Profile attributes (as defined in 3GPP TS 29.510 section 6.1.6.2.2 Type: NF Profile), NrfInfo attribute (as defined in 3GPP TS 29.510 section 6.1.6.2.31) containing updates to info attributes of producer NFs registered with this regional NRF and a list of NF service attributes (i.e., NF service information) provided by producer NFs $313_1$ to the regional NRF.

At some point after NF service producer $313_1$ registers with regional NRF 303, NF service consumer $311_1$ in region 1 sends a Nnrf discovery service request 30 for a particular NF service producer to regional NRF 301. If regional NRF 301 does not include a registration for the requested NF service producer (e.g., there are no NF service producers in region 1 matching the discovery criteria, such as service type, in the discovery service request), NRF 301 is configured to forward the Nnrf discovery service request to root NRF 304. In some embodiments, the Nnrf discovery service request includes a plurality of mandatory parameters, including a target NF type parameter and a requester NF type parameter. The Nnrf discovery service request may also include an optional 'service-names' parameter, which indicates the list of specific NF service being requested by the NF service consumer.

After receiving the forwarded discovery request from NRF 301, a root NRF is typically configured to propagate the Nnrf discovery service request to regional NRF 302 or regional NRF 303 because the root NRF has no knowledge (i.e., is unaware) of the NF services provided by the NF service producers in the hierarchical network. Notably, the root NRF typically does not receive the NF service information or service names corresponding to NF service producers via the NF profile updates sent by the regional NRFs.

To remedy this lack of NF services name visibility occurring at the root NRF, the disclosed subject matter provides a mechanism wherein root NRF 304 is provided with one or more NF service attributes (e.g., a list of service names) provided by one or more NF service producer instances via the regional NRFs. One scenario depicting an exemplary solution can similarly be depicted using FIG. 3. For example, NF service producer $313_1$ may initiate registration with regional NRF 303 in region 3. Notably, NF service producer $313_1$ registers with regional NRF 303 by sending a registration request including NF profile information (i.e., NF instance identifier (i.e., instance ID), other NF Profile attributes (as defined in 3GPP TS 29.510 section 6.1.6.2.2 Type: NF Profile), info attributes (e.g., <NF-Type>Info and/or <NF-Type>InfoList structures) and a list of one or more NF service structure(s) (as defined in 3GPP TS 29.510 section 6.1.6.2.3 Type: NF Service) including service names and other NF Service attributes that the NF service producer provides during the registration process. After receiving the NF profile information in the registration request containing the one or more NF service attributes from NF service producer $313_1$, regional NRF 303 may be configured to include the NF service attributes in a NrfInfo structure. Specifically, in response to detecting the presence of the NF service attribute information in a received request message, regional NRF 303 is configured to construct a customized attribute (e.g., a NF services structure) for inclusion in the NrfInfo structure to be sent to root NRF 304.

Figure 4:
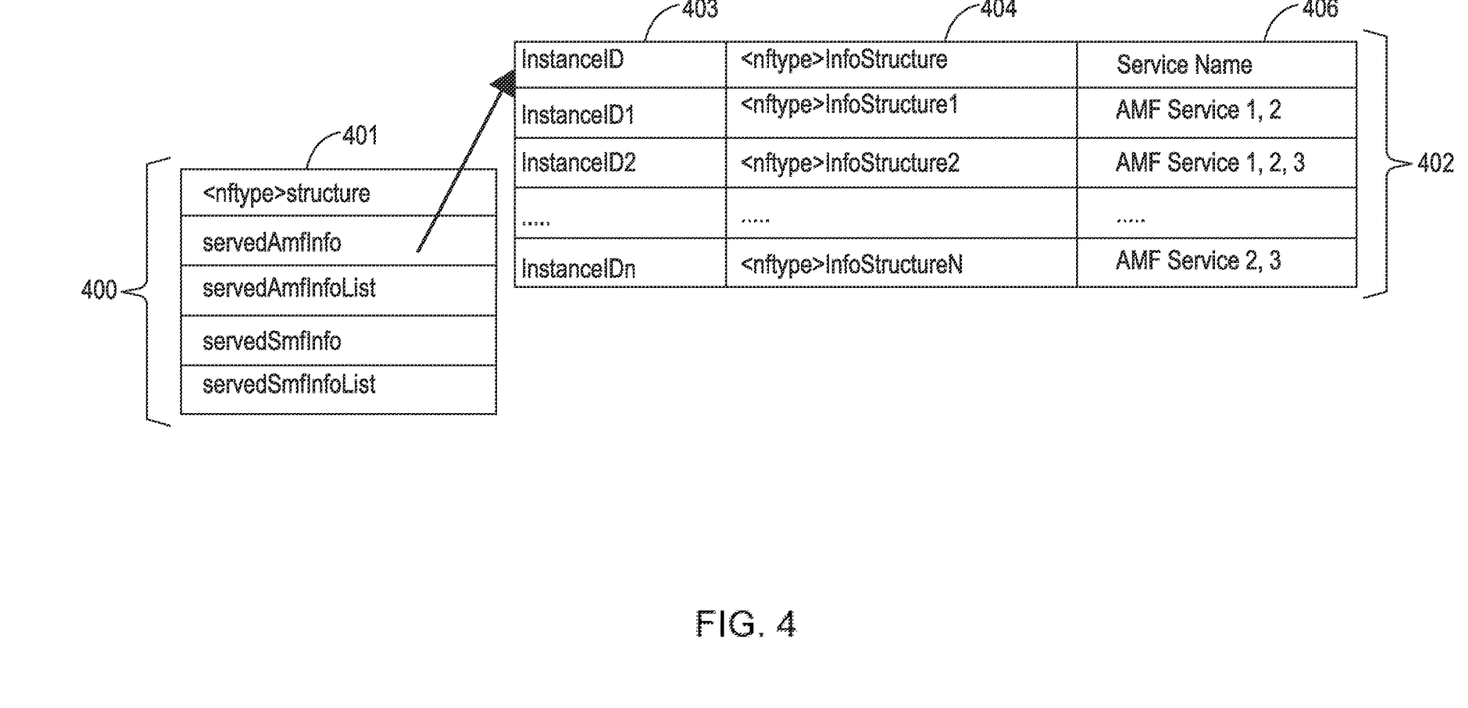
FIG. 4 is a diagram illustrating exemplary NrfInfo, <NF-Type>Info data structures, and NF service attribute structures.

One example of adding the customized NF services structure is shown in FIG. 4, which depicts exemplary NrfInfo attribute entries. For example, column 401 of NrfInfo structure 400 includes a plurality of NrfInfo attribute entries. Each of these entries includes 'Served<nftype>Info', as shown in attribute structure 400. To illustrate, the first entry in NrfInfo structure 400 is 'servedAmfInfo', which may include a number of different AMFs that are registered with a regional NRF in a specific region. Further, column 403 of data structure 402 lists a plurality of NF instance identifiers that correspond to a respective plurality of AMFs registered with the regional NRF. If the AMF supports <NF-Type>Info and <NF-Type>InfoList attributes, then the AMF's instanceID is added in column 403 and its corresponding InfoStructure information (i.e., <NF-Type>Info and/or <NF-Type>InfoList attribute data) is added in column 404 (e.g., <NF-Type>InfoStructure1 in column 404 is mapped to 'InstanceID1' identifying the AMF in column 403). Likewise, the NF service attribute(s) corresponding to the AMF instance ID is added in column 406 (e.g., Service Name attribute) if provided by the AMF service producer to the regional NRF. More specifically, the regional NRF is configured to construct and add a customized structure (e.g., <NF Service>) that is linked or mapped to the InfoStructure information in column 404 and/or the 'InstanceIDs' specified in column 403.

Returning to FIG. 3, regional NRF 303 constructs one or more customized <NF-Services>structures in the NrfInfo structure (in a regional NRF's NF profile update message) to contain the NF services information. Regional NRF 303 then inserts the NF services attribute information and/or <NF-Services>structure as a sub-section and/or entry into the NrfInfo structure. Afterwards, a registration request and/or NF update request (e.g., a NF profile update) containing the NrfInfo is sent by regional NRF 303 to root NRF 304. An example NrfInfo schema containing a constructed customized NF service structure is described below and illustrated in FIG. 5.

After the NrfInfo is provided to root NRF 304, root NRF 304 is configured to store the supported NF services for each registered NF (as shared by the regional NRF) in its local state database 306 along with other info attributes shared for each registered NF. In some embodiments, root NRF 304 is configured to extract the custom information that includes NF service attributes from the registration request and/or NF update request received from the regional NRF and create a new entry in local state database 306, which contains the NF profile information and NF service attribute(s). Notably, the NF service attribute is indexed or mapped to the instance ID of the NF service producer providing the NF service. It should be noted that the storing and/or indexing of the NF service attributes in the local state database is implementation dependent and the disclosed subject matter is not limited in scope by the examples presented herein. After storing and indexing the NF service attributes, root NRF 304 will then be in possession of the regional NRF profile of regional NRF 303 and the nfinstanceIDs of all of the NF service producers registered with regional NRF 303 in addition to a list of NF services provided by each of these registered NF service producers.

After root NRF 304 has provisioned local state database 306 with the NF service attributes as described above, NF service consumer 311 in region 1 may send a Nnrf service request (e.g., discovery request) for a particular NF service producer to NRF 301. In some embodiments, the service request message may include i) a target NF type, ii) a requester NF type, and iii) a service name. If regional NRF 301 does not have a registration for a NF service producer that can support the requested service (e.g., there are no NF service producers in region 1 matching the discovery criteria in the discovery request from NF service consumer 311$_1$), regional NRF 301 is configured to forward the discovery request to root NRF 304. In addition to providing the target NF type information that is commonly included in forward discovery request messages, the regional NRF will also provide the associated service attribute in the request message.

After receiving the forwarded discovery request from regional NRF 301, root NRF 304 is configured to access its local state information database that contains NrfInfo from the regional NRFs 301-303. In particular, root NRF 304 is configured to attempt to find a database entry that includes an indexed entry associated with a NF service identifier that matches the NF service name included in the forwarded discovery request message (as parameter service-names). Notably, root NRF 304 is configured to inspect the state information database to check for all the NrfInfo data using smart logic. For example, root NRF 304 is configured to utilize the matching NF service name and corresponding instance identifier to identify/select the specific regional NRF with the identified NF service producer capable of providing a service indicated by the NF service name.

In some instances, the root NRF 304 may identify multiple of NF service producers (e.g., hosted by regional NRFs 302 and 303). In such scenarios where more than one NF service consumer is identified as being capable of providing the service corresponding to the service name, root NRF 304 may be configured to generate an ordered list that indicates the specific NF service producers (and their respective NRFs) that handle the service request message. After generating the list including ordered NF service producer information, root NRF 304 is able to forward the Nnrf service request to the appropriate regional NRF (e.g., regional NRF 303) for further processing. Notably, root NRF 304 is able to promptly identify NF service producers that support the requested NF service that are operating in different regions in a hierarchical network deployment.

Figure 5:
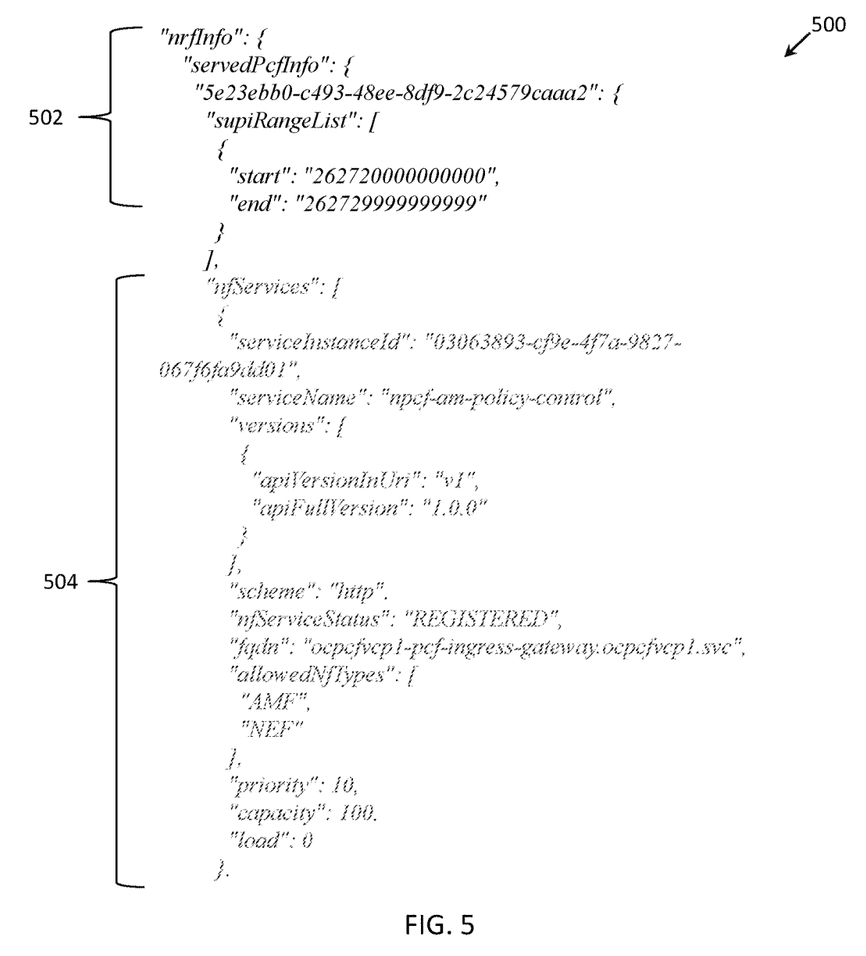
FIG. 5 is a diagram illustrating an exemplary schema of an NrfInfo structure including an NF service attribute that is communicated to a root NRF.

FIG. 5 is a diagram illustrating an schema of an NrfInfo structure that includes an NF service structure (with a service name attribute) and is communicated to a root NRF. As shown in FIG. 5, NrfInfo structure 500 includes a PcfInfo instance. In particular, PcfInfo instance 502 includes the nfinstanceID (e.g., 5e23ebb0-c493 . . . ) for a specific PCF instance operating in the local region. Notably, the regional NRF is configured to construct NrfInfo structure 500 in a NF Register message or NF Update message towards the Root NRF with custom data for all registered NFs (e.g., PcfInfo instance 502) including their nfServices or nfServiceList structures 504. Notably, NrfInfo structure 500 with nfServices structure 504 is an example of information that is inserted in an NF Profile update message directed to a root NRF. Contents of nfServices or nfServiceList structures 504 shall adhere to 3GPP TS 29.510.

Figure 6:
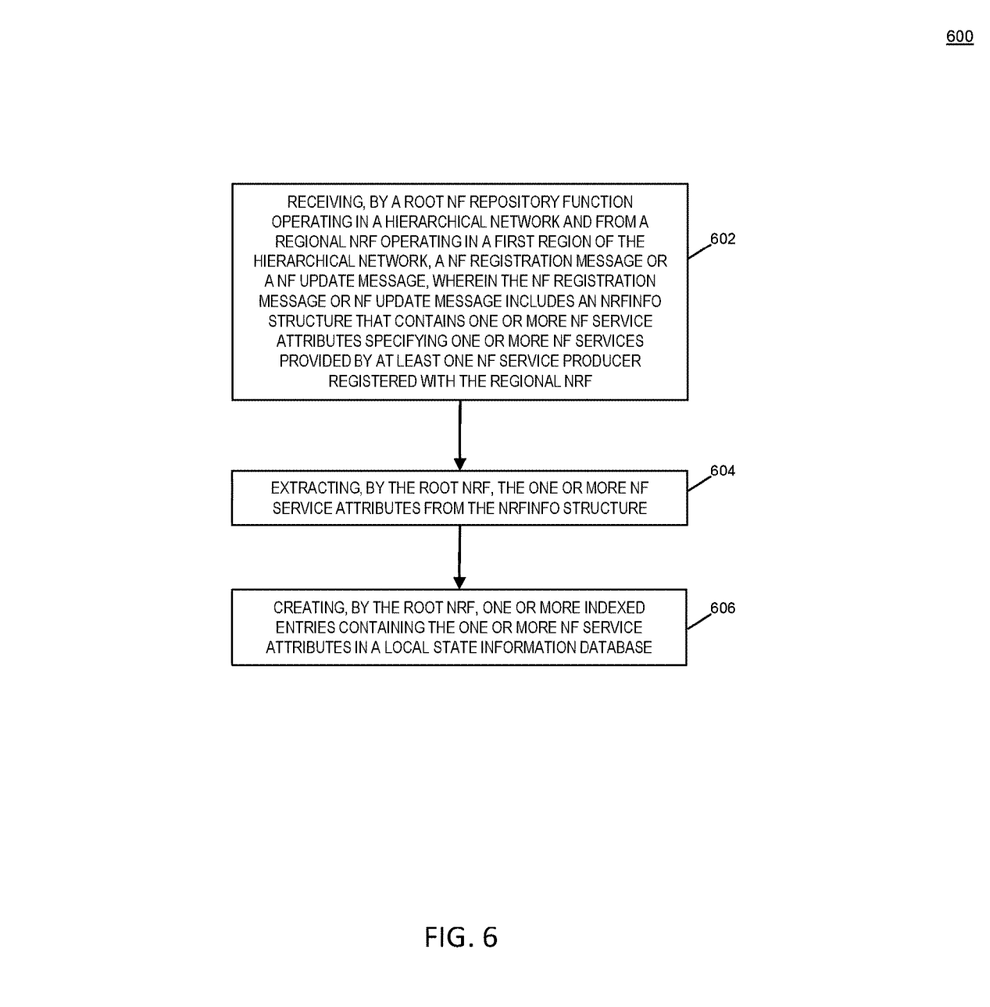
FIG. 6 is a flow diagram illustrating an exemplary method for utilizing network function service attributes associated with registered network function service producers in a hierarchical network.

FIG. 6 is a flow chart illustrating an example process for utilizing network function service attributes associated with registered network function service producers in a hierarchical network according to an embodiment of the subject matter described herein. In some embodiments, method 600 depicted in FIG. 6 is an algorithm, program, or script stored in memory that when executed by a processor performs the steps recited in blocks 602-606. In some embodiments, method 600 represents a list of steps embodied in a state machine (e.g., either via software code programming or via a set of rules) and/or logic of the NRF and/or host computing device.

In block 602, the method includes receiving, by a root NRF operating in a hierarchical network and from a regional NRF operating in a first region of the hierarchical network, a NF registration message or a NF update message. Notably, the NF registration message or NF update message includes an NrfInfo structure that contains one or more NF service attributes specifying one or more NF services provided by at least one NF service producer registered with the regional NRF. In some embodiments, a root NRF operating in the hierarchical network receives an NF profile update message that includes a list of NF services supported by NF service consumers registered with a particular regional NRF.

In block 604, the method includes extracting, by the root NRF, the one or more NF service attributes from the NrfInfo structure. In some embodiments, the root NRF is configured to parse the NrfInfo structure in the request message and extract the one or more NF service attributes from the NF profile update message.

In block 606, the method includes creating, by the root NRF, one or more indexed entries containing the one or more NF service attributes in a local state information database. In some embodiments, the root NRF is configured to construct a customized data entry in its local state information data to record the extracted NF service attribute(s) for each of the NF services.

It should be noted that the modified regional NRF, modified root NRF, and/or functionality described herein may constitute or be facilitated by a special purpose computing device. Further, the modified NRFs and/or functionality described herein can improve the technological field of network visibility by allowing root NRFs to store NF service attribute(s) that can be used to promptly identify NF service producers capable of supporting a requested NF service. Notably, the root NRF will only route and/or re-route discovery request messages to the regional NRFs that support the NF service consumers identified as providing the requested service. In particular, the ability to utilize NF service attributes in the manner described herein significantly reduces unnecessary packet traffic since the number of random attempts to locate a NF service consumer (without NF service attributes) is eliminated.

The disclosure of each of the following references is incorporated herein by reference in its entirety.

References 1. 3$^{rd}$ Generation Partnership Project; Technical Specification 5G; 5G System; Network function repository services; Stage 3 (Release 16) 3GPP TS 29.510 V16.5.0 (2020-11)

2. 3$^{rd}$ Generation Partnership Project; Technical Specification Group Services and System Aspects; Technical Realization of Service Based Architecture; Stage 3 (Release 16) 3GPP TS 29.500 V16.5.0 (2020-11)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for utilizing network function (NF) service attributes associated with registered network function service producers in a hierarchical network, the method comprising:
   receiving, by a root network function repository function (NRF) operating in a hierarchical network and from a regional NRF operating in a first region of the hierarchical network, a NF registration message or a NF update message, wherein the NF registration message or NF update message includes an NrfInfo structure that contains one or more NF service attributes specifying one or more NF services provided by at least one NF service producer registered with the regional NRF;
   extracting, by the root NRF, the one or more NF service attributes from the NrfInfo structure; and
   creating, by the root NRF, one or more indexed entries containing the one or more NF service attributes in a local state information database., wherein the one or more NF service attributes are mapped to NF service producer instance identifiers associated with the at least one NF service producer registered with the regional NRF.

2. The method of claim 1 wherein the root NRF is configured to direct a service request message received from a second regional NRF to the regional NRF using the one or more NF service attributes stored in the local state information database.

3. The method of claim 2 wherein the service request message includes at least one of: a Nnrf subscription request message, a Nnrf discovery request message, or a Nnrf access token request message.

4. The method of claim 1 wherein the regional NRF is configured to insert the one or more NF service attributes as a customized attribute in the NrfInfo structure.

5. The method of claim 4 wherein the customized attribute includes a customized NF service structure that specifies the one or more NF services.

6. The method of claim 1 wherein the NrfInfo structure is provided to the root NRF via an NF profile update message sent by the regional NRF.

7. The method of claim 1 wherein the NrfInfo structure is a JavaScript Object Notation (JSON) data structure.

8. A system for utilizing network function (NF) service attributes associated with registered network function service producers in a hierarchical network, the system comprising:
   a regional NRF operating in a first region of the hierarchical network and configured to generate a NF registration message or a NF update message; and
   a root network function repository function (NRF) that operates in a hierarchical network and includes a local state information database configured to receive, from the regional NRF, the NF registration message or the NF update message, wherein the NF registration message or NF update message includes an NrfInfo structure that contains one or more NF service attributes specifying one or more NF services provided by at least one NF service producer registered with the regional NRF, extract the one or more NF service attributes from the NrfInfo structure, and create one or more indexed entries containing the one or more NF service attributes in a local state information database, wherein the one or more NF service attributes are mapped to NF service producer instance identifiers associated with the at least one NF service producer registered with the regional NRF.

9. The system of claim 8 wherein the root NRF is configured to direct a service request message received from a second regional NRF to the regional NRF using the one or more NF service attributes stored in the local state information database.

10. The system of claim 9 wherein the service request message includes at least one of: a Nnrf subscription request message, a Nnrf discovery request message, or a Nnrf access token request message.

11. The system of claim 8 wherein the regional NRF is configured to insert the one or more NF service attributes as a customized attribute in the NrfInfo structure.

12. The system of claim 11 wherein the customized attribute includes a customized NF service structure that specifies the one or more NF services.

13. The system of claim 8 wherein the NrfInfo structure is provided to the root NRF via an NF profile update message sent by the regional NRF.

14. The system of claim 8 wherein the NrfInfo structure is a JavaScript Object Notation (JSON) data structure.

15. One or more non-transitory computer readable media having stored thereon executable instructions that when executed by at least one processor of a computer cause the computer to perform steps comprising:
   receiving, by a root network function repository function (NRF) operating in a hierarchical network and from a regional NRF operating in a first region of the hierarchical network, a NF registration message or a NF update message, wherein the NF registration message or NF update message includes an NrfInfo structure that contains one or more NF service attributes specifying one or more NF services provided by at least one NF service producer registered with the regional NRF;
   extracting, by the root NRF, the one or more NF service attributes from the NrfInfo structure; and
   creating, by the root NRF, one or more indexed entries containing the one or more NF service attributes in a local state information database., wherein the one or more NF service attributes are mapped to NF service producer instance identifiers associated with the at least one NF service producer registered with the regional NRF.

16. The one or more non-transitory computer readable media of claim 15 wherein the root NRF is configured to direct a service request message received from a second regional NRF to the regional NRF using the one or more NF service attributes stored in the local state information database.

17. The one or more non-transitory computer readable media of claim 16 wherein the service request message includes at least one of: a Nnrf subscription request message, a Nnrf discovery request message, or a Nnrf access token request message.

18. The one or more non-transitory computer readable media of claim 15 wherein the regional NRF is configured to insert the one or more NF service attributes as a customized attribute in the NrfInfo structure.

19. The one or more non-transitory computer readable media of claim 18 wherein the customized attribute includes a customized NF service structure that specifies the one or more NF services.

20. The one or more non-transitory computer readable media of claim 15 wherein the NrfInfo structure is provided to the root NRF via an NF profile update message sent by the regional NRF.

\* \* \* \* \*

UNITED STATES PATENT AND TRADEMARK OFFICE
CERTIFICATE OF CORRECTION

PATENT NO. : 11,743,363 B1
APPLICATION NO. : 17/751584
DATED : August 29, 2023
INVENTOR(S) : Goel It is certified that error appears in the above-identified patent and that said Letters Patent is hereby corrected as shown below:

On the Title Page

On page 2, Column 1 under Other Publications, Line 3, delete "(Reiease" and insert -- (Release --, therefor.

In the Specification

In Column 7, Line 47, before "for" delete "30", therefor.

In Column 8, Line 22, delete "process." and insert -- process). --, therefor.

In the Claims

In Column 11, Line 45, in Claim 1, delete "database.," and insert -- database, --, therefor.

In Column 12, Line 66, in Claim 15, delete "database.," and insert -- database, --, therefor.

Signed and Sealed this
Eighteenth Day of June, 2024

Katherine Kelly Vidal
*Director of the United States Patent and Trademark Office*